L. L. Pollard,
Shoemakers' Tool,
N° 23,606.      Patented Apr. 12, 1859.
Fig. 1.
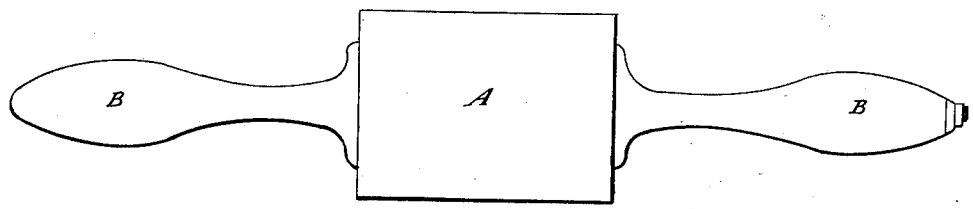
Fig. 2.
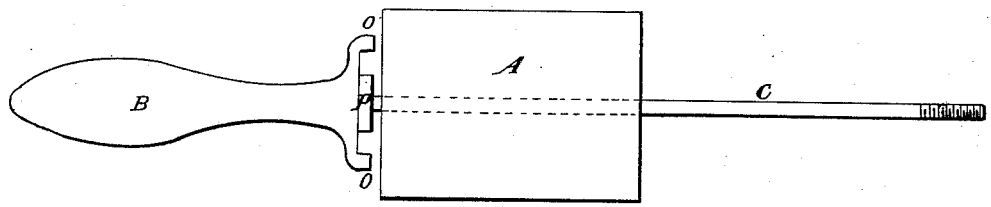
Fig. 3.    Fig. 4.    Fig. 5.
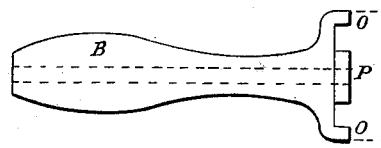  
Fig. 6.
Witnesses.
W. A. Hacker.
Jas. G. Arnold.
Inventor.
Leonard L. Pollard.

UNITED STATES PATENT OFFICE.

LEONARD L. POLLARD, OF WORCESTER, MASSACHUSETTS.

TREEING-STICK.

Specification of Letters Patent No. 23,606, dated April 12, 1859.

*To all whom it may concern:*

Be it known that I, LEONARD L. POLLARD, of the city and county of Worcester, State of Massachusetts, have invented certain new and useful Improvements in the Construction of Treeing-Sticks; and I hereby declare the following to be a full, clear, and exact description of the same, reference being had to the accompanying drawings, in which—

Figure 1 shows the improved stick. Figs. 3, 4, 5, and 6 show the separate parts hereinafter more particularly to be described.

The same letters denote the same parts.

In the use of treeing sticks the middle or rubbing part A Fig. 1 receives the wear and consequently is the first usually to fail.

My invention relates to renewing this part and consists in making the part movable and held in place by the others.

To construct my invention make the handles B, B with projecting nibs or studs $o$, $o$, as seen in Figs. 2 and 3, and 4 and in each end of A make cavities to receive these nibs as shown in Fig. 5 to one of the handles the rod $c$ is firmly attached and passes through A and the other handle and has a screw on its end on which fits the nut shown in Fig. 6 which holds all together the nibs being firmly connected to the handles prevent A from turning without them and by slacking the screw and separating the handles A may be removed and a new or different one substituted, between the nibs on each handle make a projecting ferrule P, P, and a corresponding recess in each end of A these are to strengthen A at its middle line around the hole made for the rod $c$.

I am aware that it is common to secure handles to various tools by means of a rod and screw and nut this I do not claim as my invention consists in the holding the middle part by the others by means of the nibs or their equivalent.

What I claim as new and desire to secure by Letters Patent is,

I claim as a new article of manufacture the above described treeing stick when constructed and operating in the manner and for the purposes above set forth.

In witness whereof I have hereunto set my hand in the presence of two witnesses.

LEONARD L. POLLARD.

Witnesses:
 W. A. HACKER,
 JAS. G. ARNOLD.